(12) United States Patent
Yeung (10) Patent No.: US 9,117,037 B2
(45) Date of Patent: Aug. 25, 2015

(54) INTERFACE APPARATUS, CASCADING SYSTEM THEREOF AND CASCADING METHOD THEREOF

(75) Inventor: Sip Kim Yeung, New Taipei (TW)

(73) Assignee: Acer Incorporated, New Taipei (TW)

(*) Notice: Subject to any disclaimer, the term of this patent is extended or adjusted under 35 U.S.C. 154(b) by 290 days.

(21) Appl. No.: 13/565,818

(22) Filed: Aug. 3, 2012

(65) Prior Publication Data

US 2013/0132633 A1  May 23, 2013

Related U.S. Application Data

(60) Provisional application No. 61/562,409, filed on Nov. 21, 2011.

(30) Foreign Application Priority Data

Mar. 29, 2012  (TW) .............................. 101111123 A (51) Int. Cl.
| | |
|---|---|
| *G06F 13/42* | (2006.01) |
| *G06F 13/28* | (2006.01) |
| *G06F 13/36* | (2006.01) |
| *G06F 3/00* | (2006.01) |
| *H04L 12/52* | (2006.01) |
| *H04L 12/56* | (2006.01) |

(52) U.S. Cl.
CPC ............ *G06F 13/4247* (2013.01); *G06F 13/36* (2013.01); *G06F 3/00* (2013.01); *G06F 13/28* (2013.01)

(58) Field of Classification Search
CPC ........... G06F 13/36; G06F 13/28; G06F 3/00; G06F 13/4247; H04L 12/56; H04L 12/52
USPC ........................................................ 710/306
See application file for complete search history.

(56) References Cited

U.S. PATENT DOCUMENTS

| 5,016,248 A | * | 5/1991 | Kudoh ........................... 370/413 |
| 6,055,225 A | | 4/2000 | Wu |
| 6,067,595 A | * | 5/2000 | Lindenstruth ................. 710/307 |
| 8,706,840 B2 | * | 4/2014 | Knowles et al. .............. 709/217 |

(Continued)

FOREIGN PATENT DOCUMENTS

| CN | 1291746 | 4/2001 |
| CN | 1391672 | 1/2003 |

(Continued)

*Primary Examiner* — Ryan Stiglic
*Assistant Examiner* — Christopher A Daley
(74) *Attorney, Agent, or Firm* — Jianq Chyun IP Office (57) ABSTRACT

An interface apparatus, a cascading system thereof, and a cascading method thereof are provided. The cascading system includes a host, a first-type interface apparatus, and a second-type interface apparatus which are serially connected. The host provides data transmission of a first and a second channel by a first controller through a first interface port. In the first-type interface apparatus, data of the first channel is transmitted to a second controller through a second interface port and then to a third interface port, and data of the second channel is directly transmitted to the third interface port through the second interface port. In the second-type interface apparatus, the data of the second channel are transmitted to a third controller through a forth interface port and then to the fifth interface port, and the data of the first channel is directly transmitted to the fifth interface port through the forth interface port.

10 Claims, 6 Drawing Sheets

(56) References Cited

U.S. PATENT DOCUMENTS

| | | |
|---|---|---|
| 2004/0225777 A1 | 11/2004 | Greeff et al. |
| 2010/0088436 A1 | 4/2010 | Knauss et al. |
| 2010/0183004 A1* | 7/2010 | Kobayashi .................... 370/389 |
| 2011/0153888 A1 | 6/2011 | Sun et al. |
| 2012/0270419 A1* | 10/2012 | Shahoian et al. ............... 439/55 |
| 2012/0284434 A1* | 11/2012 | Warren et al. .................. 710/22 |

FOREIGN PATENT DOCUMENTS

| | | |
|---|---|---|
| CN | 2627744 | 7/2004 |
| TW | 476030 | 2/2002 |
| TW | 200821852 | 5/2008 |
| TW | 201122832 | 7/2011 |

* cited by examiner

INTERFACE APPARATUS, CASCADING SYSTEM THEREOF AND CASCADING METHOD THEREOF

CROSS-REFERENCE TO RELATED APPLICATION

This application claims the priority benefits of U.S. provisional application Ser. No. 61/562,409, filed on Nov. 21, 2011 and Taiwan application serial no. 101111123, filed on Mar. 29, 2012. The entirety of each of the above-mentioned patent applications is hereby incorporated by reference herein and made a part of this specification.

BACKGROUND

1. Technical Field

The present invention relates to an interface apparatus and a cascading method thereof, and more particularly to an interface apparatus that utilizes the Thunderbolt interface, a cascading system thereof and a cascading method thereof.

2. Description of Related Art

As the technology advancements and rapid changes of the computer functions, a wide variety of peripherals are emerging continually. For user's convenience to upgrade or to expand computer performance or function, the computer motherboards are usually equipped with AGP, PCI, PCI-E, and ISA slots for users to install a video card, a sound card, a network card, or other expansion cards. Furthermore, motherboards are also equipped with Firewire, USB, and other expansion interfaces for users to connect hard drives, printers, and other external devices.

Figure 1:
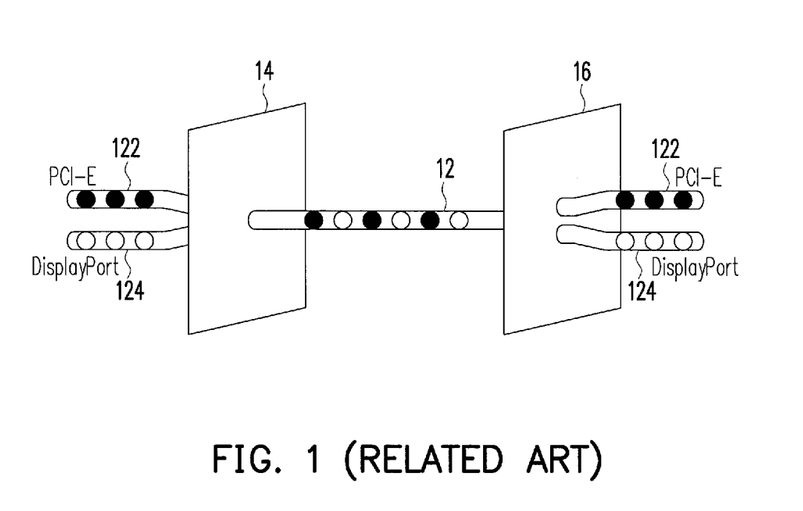
FIG. 1 is a diagram illustrating the data transmission of the Thunderbolt interface.

Recently, Intel Corporation from United State has released a whole new Thunderbolt interface which integrates PCI Express and DisplayPort technologies together, so as to transmit data and video streaming through a single cable simultaneously. FIG. 1 is a diagram illustrating the data transmission of the Thunderbolt interface. Referring to FIG. 1, the Thunderbolt transmission technology provides two channels 122 and 124 on a cable 12 which are served as the PCI-E and the DisplayPort to transmit data and stream video respectively. Relying on the control of two Thunderbolt controllers 14 and 16 which are at two ends of the cable 12, the transmission rate of each channel may reach up to 10 Gb/s for both directions. This allows high speed data transmission between a computer and peripherals. The bandwidth provided by the Thunderbolt technology allows several high speed devices to be daisy chained without a hub or a switch.

Figure 2:
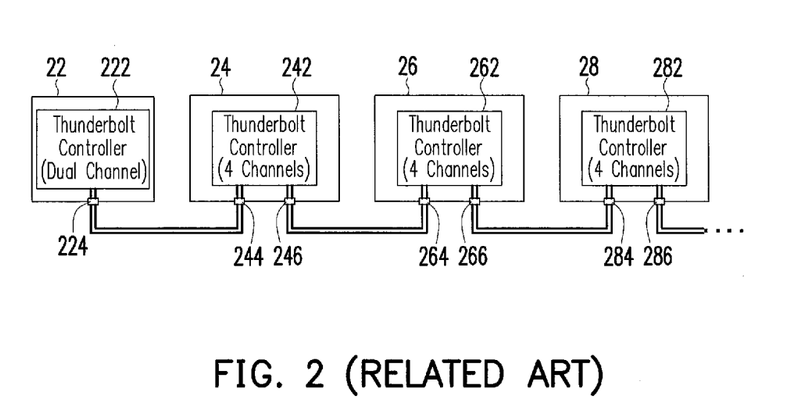
FIG. 2 is a conventional daisy chain connection of the Thunderbolt interface architecture.

For example, FIG. 2 is a conventional daisy-chain connection of the Thunderbolt interface architecture. Referring to FIG. 2, in order to implement a daisy chain cascading connection, a host 22, as a master terminal, requires a Thunderbolt interface port 222 and a Thunderbolt controller 224 supporting dual-channel transmission. The downstream cascaded Thunderbolt interface apparatuses 24, 26, and 28 are required to respectively equip two or more Thunderbolt interface ports 242, 244, 262, 264, 282, and 284. Since each of the Thunderbolt interfaces has 2 channels, the Thunderbolt controllers 246, 266, and 286 in the Thunderbolt interface apparatus 24, 26, and 28 are required to be configured to support four channel transmissions. Therefore, the production costs of the interface apparatus are increased.

However, two channels of the Thunderbolt interface are configured for data transmission and video streaming only, and Thunderbolt interface does not support channel aggregation, hence the transmission efficiency are limited. When the Thunderbolt apparatuses cascaded by the user do not include a display related device, the video streaming channel of the Thunderbolt device remains idle. In this case, the costly Thunderbolt interface port and controller can only supply half transmission efficiency, which is waste of resources. Furthermore, the daisy-chain architecture does not have a fault-tolerance function. When one Thunderbolt apparatus fails or malfunctions, all the downstream cascaded Thunderbolt apparatuses are disconnected as the daisy chain is broken, which may also result in data loss.

SUMMARY OF THE DISCLOSURE

Accordingly, the present invention provides an interface apparatus, a cascading system thereof, and a cascading method thereof, which may enhance the transmission efficiency of an interface and also supports fault-tolerance function.

The present invention provides an interface apparatus cascading system, which includes a host, a first-type interface apparatus, and a second-type interface apparatus. The host includes a first controller and a first interface port, wherein data of a first channel and a second channel are transmitted by the first controller through the first interface port. The first-type interface apparatus includes a second controller, a second interface port, and a third interface port, wherein the second interface port is connected in series with the first interface port; the third interface port is connected with the second interface port; and the second controller is connected with the second interface port and the third interface port. Data of the first channel is transmitted to the second controller through the second interface port and to the third interface port through the second controller, and data of the second channel is directly transmitted to the third interface port through the second interface port. The second-type interface apparatus includes a third controller, a forth interface port, and a fifth interface port, wherein the forth interface port is connected in series with the third interface port; the fifth interface port is connected with the forth interface port; and the third controller is connected with the forth interface port and the fifth interface port. Data of the second channel is transmitted to the third controller through the forth interface port and to the fifth interface port through the third controller, and data of the first channel is directly transmitted to the fifth interface port through the forth interface port.

According to an embodiment of the present invention, the interface cascading system further includes a plurality of the first-type interface apparatus that are respectively connected in series with the second-type interface apparatus to process the data transmitted through the first channel.

According to an embodiment of the present invention, the interface cascading system further includes a plurality of the second-type interface apparatus that are respectively connected in series with the first-type interface apparatus to process the data transmitted through the second channel.

According to an embodiment of the present invention, the first-type interface apparatus and the second-type interface apparatus are two disks in the disk array (RAID), respectively.

The present invention provides an interface apparatus cascading method. First, a host which includes a first controller and a first interface port is provided. Next, the first-type interface apparatus is connected in series with the host, in which data of the first channel is transmitted to the second controller through the second interface port of the first-type interface apparatus and to the third interface port through the second controller, and data of the second channel is directly transmitted to the third interface port through the second interface port. The second-type interface apparatus is connected in series with the first-type interface apparatus, in which data of the second channel are transmitted to the third controller through the forth interface port of the second-type interface apparatus and to the fifth interface port through the third controller, and data of the first channel are directly transmitted to the fifth interface port through the forth interface port.

According to an embodiment of the present invention, the method further connects another first-type interface apparatus in series with the second-type interface apparatus to process the data transmitted through the first channel.

According to an embodiment of the present invention, the method further connects another second-type interface apparatus in series with the first-type interface apparatus to process the data transmitted through the second channel.

According to an embodiment of the present invention, the method further transmits a backup data to the first-type interface apparatus and the second-type interface apparatus through the first channel and the second channel, and stores the backup data in the first-type interface apparatus and the second-type interface apparatus.

According to an embodiment of the present invention, the first controller, the second controller, and third controller described above are Thunderbolt controllers supporting dual-channel data transmission.

According to an embodiment of the present invention, the first-type interface apparatus and the second-type interface apparatus described above include a graphics processing device, a display device, a storage device, or a recordable device utilizing Thunderbolt interface.

The present invention provides an interface apparatus, which includes a first interface port, a controller, and a second interface port. The first interface port is connected in series with the host or another interface apparatus to receive data transmitted through a first channel and a second channel. The controller is connected to the first interface port and configured to receive and process data of the first channel, and output the processed data of the first channel. The second interface port is connected to the first interface port and the controller, and is configured to receive the data of the second channel from the first interface port and receive the processed data of the first channel from the first controller.

According to an embodiment of the present invention, the first channel and the second channel described above are one of two data transmission channels of the Thunderbolt interface, respectively.

According to an embodiment of the present invention, the controller described above is a Thunderbolt controller supporting dual-channel data transmission.

Base on the above, the interface apparatus, cascading system thereof, and cascading method thereof of the disclosure change the connection relationship between the interface ports and the controller in the interface apparatus to split two data transmission channels of the Thunderbolt interface, such that data transmitted through different channels may be respectively processed by two interface apparatuses connected in series with the host. Thereby, the transmission efficiency of the interface is enhanced, and data fault-tolerance function is supported.

BRIEF DESCRIPTION OF THE DRAWINGS

The accompany drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Reference will now be made in detail to the present embodiments of the invention, examples of which are illustrated in the accompanying drawings. Wherever possible, the same reference numbers are used in the drawings and description to refer to the same or like part.

The embodiments of the present invention utilize the high-bandwidth and the daisy-chain characteristics of the Thunderbolt interface to transfer data with two data transmission channels of the Thunderbolt interface. An interface apparatus is designed to process data of one channel, and bypass data of the other channel, which is provided for another cascaded interface apparatus to process. Therefore, not only the transmission efficiency of the two channels can be utilized effectively, but the system can be equipped with fault-tolerance function.

Figure 3:
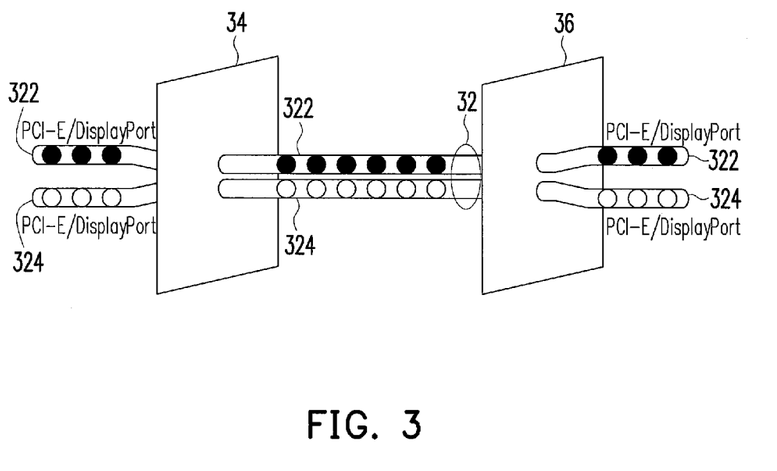
FIG. 3 is a diagram illustrating the data transmission of the Thunderbolt interface according to an exemplary embodiment of the present invention.

FIG. 3 is a diagram illustrating data transmission of the Thunderbolt interface according to an exemplary embodiment of the present invention. Referring to FIG. 3, two channels 322, 324 are provided in a cable 32 in the present embodiment. By the control of Thunderbolt controllers 34, 36 disposed at two ends of the cable 32, the two channels 322, 324 are configured to transmit data, which includes data of a PCI express interface data and/or an DisplayPort.

Figure 4:
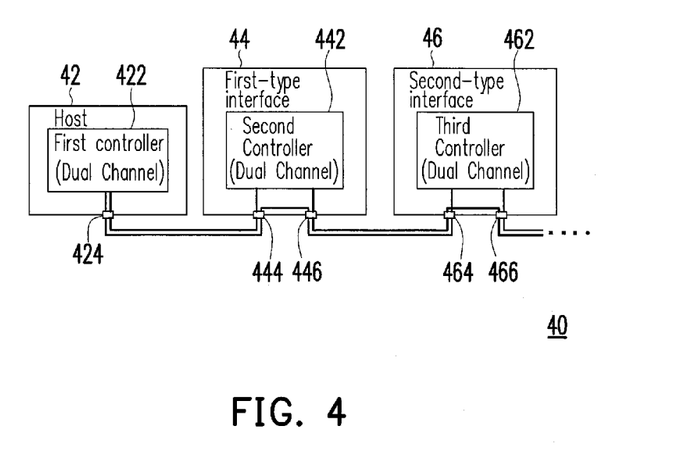
FIG. 4 is a block diagram illustrating an interface cascading system according to an exemplary embodiment of the present invention.

FIG. 4 is a block diagram illustrating an interface apparatus cascading system according to an embodiment of the present invention. Referring to FIG. 4, the interface apparatus cascading system 40 of the present embodiment includes a host 42, a first-type interface apparatus 44, and a second-type interface apparatus 46, and the functions thereof are described below:

The host 42 may be a desktop computer, a notebook computer, a workstation, or other terminal apparatus, and includes a processor and various input and output interfaces, The host 42 may be connected with peripherals and process programs executed by users. The host 42 also includes a memory, a hard-drive, or other storage device to store data executed by the processor or other data. The host 42 also includes a first controller 422 and a first interface port 424, in which the first controller 422 may provide data transmission of a first channel and a second channel through the first interface port 424. The first controller 422 is, for example, a Thunderbolt controller supporting dual-channel data transmission of the Thunderbolt interface, and may provide a function of dual-channel data transmission through the first interface port 424.

The first-type interface apparatus 44 may be a graphics processing device (including a graphics processing unit (GPU)), a display device, a storage device, a recordable device, or other peripherals utilizing the Thunderbolt interface for data transmission. The first-type interface apparatus 44 includes a second controller 442, a second interface 444, and a third interface port 446. The second interface port 444 is connected in series with the first interface port 424, the third interface port 446 is connected with the second interface port 444, and the second controller 442 is connected with the second interface port 444 and the third interface port 446. Hence, data of the first channel outputted by the host 42 may be transmitted to the second controller 442 through the second interface port 444, and to the third interface port 446 through the second controller 442. Data of the second channel of the host 42 may be directly transmitted to the third interface port 446 through the second interface port 444.

The second-type interface apparatus 46 may also be a graphics processing device (including a graphics processing unit (GPU)), a display device, a storage device, a recordable device, or other peripherals utilizing the Thunderbolt interface for data transmission. The second-type interface apparatus 46 includes a third controller 462, a forth interface port 464, and a fifth interface port 466. The forth interface port 464 is connected in series with the third interface port 446, the fifth interface port 466 is connected with the forth interface port 464, and the third controller 462 is connected with the forth interface port 464 and the fifth interface port 466. Hence, data of the second channel outputted by the first-type interface apparatus 44 may be transmitted to the third controller 462 through the forth interface port 464, and to the fifth interface port 466 through the third controller 462. Data of the first channel of the first-type interface apparatus 44 may be directly transmitted to the fifth interface port 466 through the forth interface port 464.

By the architecture of the interface apparatus cascading system described above, the Thunderbolt controllers disposed in the host 42, the first-type interface apparatus 44, and the second-type interface apparatus 46 are required to support dual-channel data transmission only rather than four-channel data transmission. Thereby, the production costs of the interface apparatus are decreased.

Furthermore, data of the second channel is directly transmitted to the third interface port 446 through the second interface port 444 of the first-type interface apparatus 44. Therefore, even if the first-type interface apparatus 44 fails or malfunctions, data of the second channel can still be transmitted to the second-type interface apparatus 46 connected in series with the first-type interface apparatus 44 by directly bypassing the first interface apparatus 44. Similarly, data of the first channel is directly transmitted to the fifth interface port 466 through the forth interface port 464 of the second-type interface apparatus 46. Therefore, even if the second-type interface apparatus 46 fails or malfunctions, data of the first channel may still be transmitted to another first-type interface apparatus (not shown) connected in series with the second-type interface apparatus 46 by directly bypassing the second-type interface apparatus 46. Base on the architecture described above, the interface apparatus cascading system 40 of the present embodiment may further attain the data fault-tolerance function.

Figure 5:
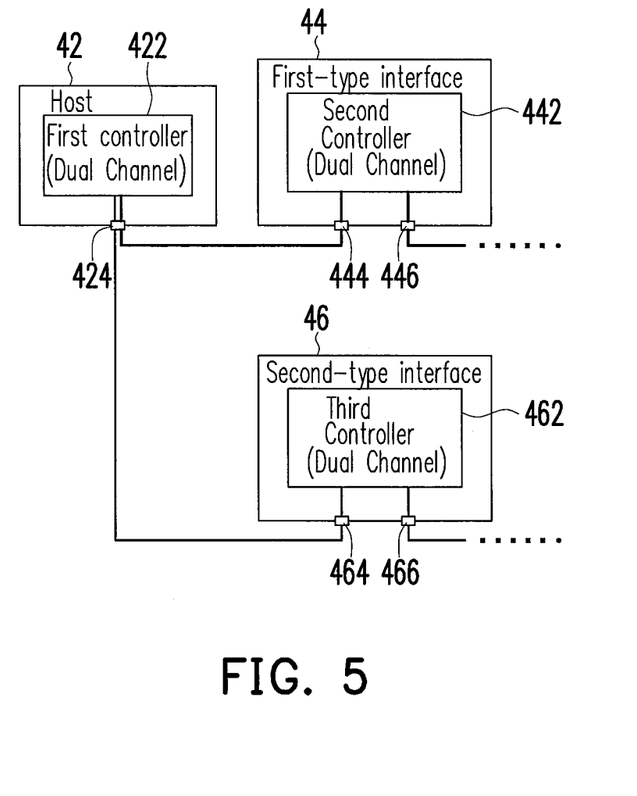
FIG. 5 is a diagram illustrating the data transmission path of the interface cascading system according to an exemplary embodiment of the present invention.

For example, the first-type interface apparatus 44 and the second-type interface apparatus 46 may be two disks in a disk array (RAID), respectively, such as RAID 0 and RAID 1. If data transmission paths of the first channel and the second channel provided by the host 42 are viewed separately, a system structure as illustrated in FIG. 5 may be obtained. In the system, the host 42 respectively transmits a backup data to the first-type interface apparatus 44 and the second-type interface apparatus 46 through the first channel and the second channel, and respectively stores the backup data in the first-type interface apparatus 44 and the second-type interface apparatus 46. Accordingly, even if one of the first-type interface apparatus 44 and the second-type interface apparatus 46 fails or malfunctions, the backup data remains in the other apparatus, and thereby the data fault-tolerance function is attained.

It should be noted that the system structure described above may further support cascading connections of a plurality of the first-type interface apparatuses and the second-type interface apparatuses. To do so, the first-type interface apparatuses are connected in series with the host or the second interface apparatuses, and the second-type interface apparatus are connected in series with the first-type interface apparatuses. By the daisy chain characteristic of the Thunderbolt interface, the interface apparatuses that are connected in series with the host may share the bandwidth of dual-channel transmission of the Thunderbolt interface so as to supply functions needed by the host.

Figure 6:
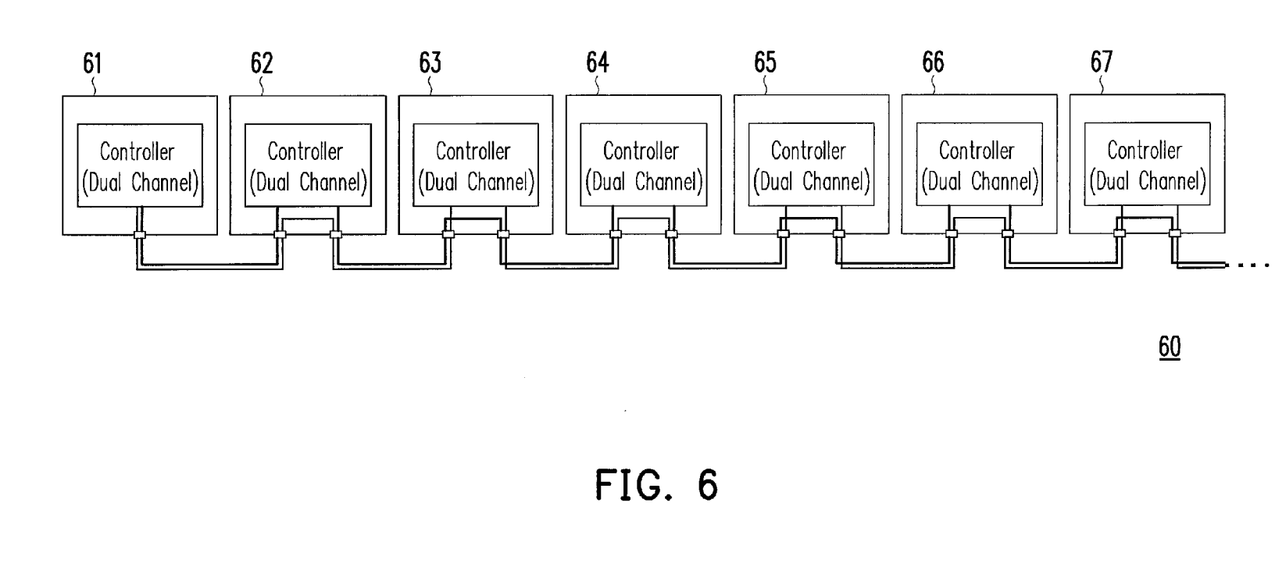
FIG. 6 is a block diagram illustrating the interface cascading system according to an exemplary embodiment of the present invention.

For example, FIG. 6 is a block diagram illustrating the interface apparatus cascading system according to an embodiment of the present invention. Referring to FIG. 6, in this embodiment, an interface apparatus cascading system 60 includes a host 61, a plurality of first-type interface apparatus 62, 64, and, 66, and a plurality of second-type interface apparatus 63, 65, and, 67. According to the system structure of the present embodiment in the FIG. 6, data of the first channel provided by the host 61 is only transmitted to the controllers of the first-type interface apparatus 62, 64, and 66, and processed by the first-type interface apparatus 62, 64, and 66. On the other hand, data of the second channel provided by the host 61 is only transmitted to the controllers of the second-type interface apparatus 63, 65, and 67, and processed by the second-type interface apparatus 63, 65, and 67.

Figure 7:
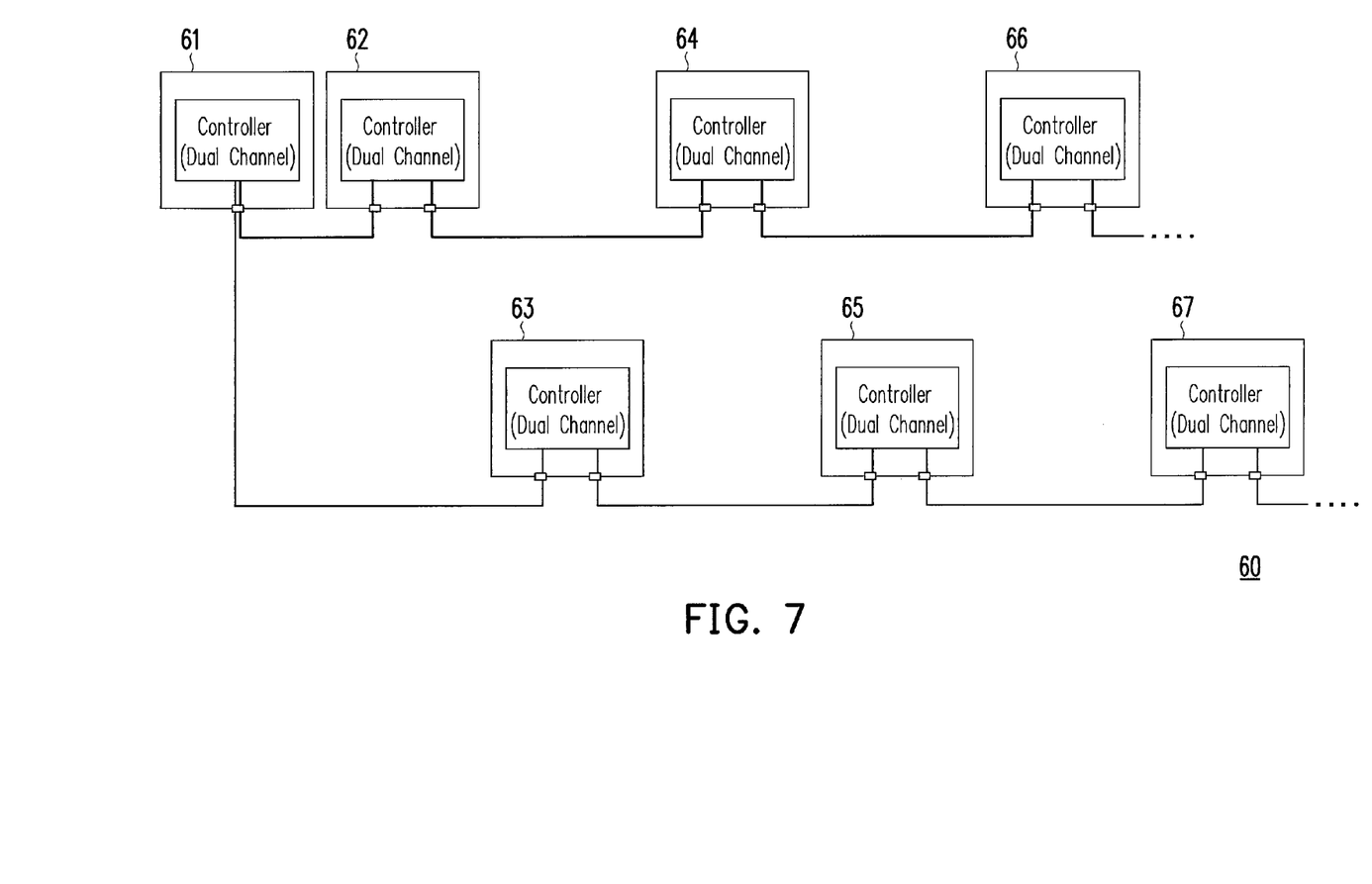
FIG. 7 is a diagram illustrating the data transmission path of the interface cascading system of an embodiment.

It should be noted that if data transmission paths of the first channel and the second channel provided by the host 61 are viewed separately, a system structure as illustrated in FIG. 7 may be obtained. According to specification of the Thunderbolt interface, the transmission rate of each channel may reach up to 10 Gbit/s in both directions, and bandwidth of the channel is shared by the interface apparatuses that are connected on the same transmission path. According to the bandwidth demand of each interface apparatus, the present embodiment further selects the interface apparatus with higher bandwidth demand (e.g. a graphics processing apparatus) and the interface apparatus with lower bandwidth demand (e.g. a disc drive) as a pair to be disposed on the data transmission path of the same channel while disposing other interface apparatuses with lower bandwidth demand on the data transmission path of the other channel. Thereby, the transmission efficiency is optimized.

Figure 8:
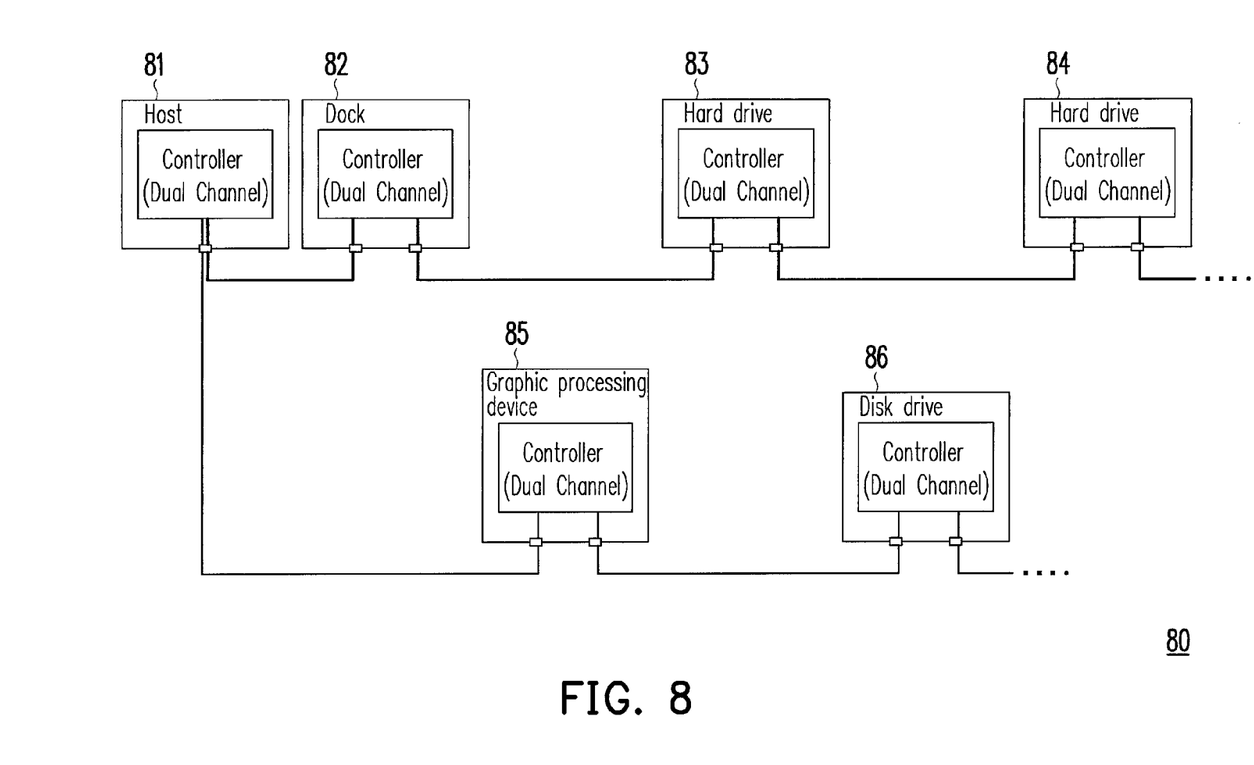
FIG. 8 is a diagram illustrating the data transmission path of the interface cascading system according to an embodiment of the present invention.

For example, FIG. 8 is a diagram illustrating the data transmission path of the interface apparatus cascading system according to an embodiment of the present invention. Referring to FIG. 8, an interface apparatus cascading system 80 of the present embodiment includes a host 81, a dock 82, a hard drive 83, a hard drive 84, a graphics processing apparatus 85, and a disk drive 86. The host 81 provides a data transmission function of a first channel and a second channel of the Thunderbolt interface. The dock 82, the hard drive 83, and the hard drive 84 are disposed on the data transmission path of the first channel, and share the bandwidth of the first channel. On the other hand, the graphics processing apparatus 85, and the disk drive 86 are disposed on the data transmission path of the second channel, and share the bandwidth of the second channel. Since the bandwidth demand and a usage rate of the disk drive 86 is low, most of the bandwidth of the second channel can be provided for the graphics processing apparatus 85 to use. Thereby, the transmission efficiency is optimized.

In summary, the interface apparatus, the cascading system thereof and the cascading method thereof of the present invention adapt a design that separates two data transmission channels of the Thunderbolt interface, so the controllers of the interface apparatuses are only required to process data transmission of two channels, thereby, the production cost of the interface apparatus is decreased. Furthermore, the interface apparatuses connected in series with the host may respectively process data of different channels without being affected by the malfunction of the interface apparatus. Therefore, the transmission efficiency of the interface apparatus is utilized effectively, and the data fault-tolerance function is supported.

It will be apparent to those skilled in the art that various modifications and variations can be made to the structure of the disclosed embodiments without departing from the scope of spirit of the disclosure. In view of the foregoing, it is intended that the disclosure cover modifications and variations of this disclosure provided they fall within the scope of the following claims and their equivalents.

What is claimed is:

1. An interface apparatus cascading system, comprising:
   a host, comprising a first controller and a first interface port, wherein the first controller provides data transmission of a first channel and a second channel through the first interface port;
   a first-type interface apparatus, comprising a second controller, a second interface port, and a third interface port, wherein the second interface port is connected in series with the first interface port, the third interface port is connected with the second interface port, data of the first channel is transmitted to the second controller through the second interface port and to the third interface port through the second controller, and data of the second channel is directly transmitted to the third interface port through the second interface port, wherein the data of the second channel cannot be transmitted to the second controller; and
   a second-type interface apparatus, comprising a third controller, a forth interface port, and a fifth interface port, wherein the forth interface port is connected in series with the third interface port, the fifth interface port is connected in series with the forth interface port, the data of the second channel are transmitted to the third controller through the forth interface port and to the fifth interface port through the third controller, and the data of the first channel is directly transmitted to the fifth interface port through the forth interface port, wherein the data of the first channel cannot be transmitted to the third controller,
   wherein the first controller, the second controller, and the third controller are Thunderbolt controllers supporting dual-channel data transmission.

2. The interface apparatus cascading system according to claim 1, further comprising:
   a plurality of first-type interface apparatus, respectively connected in series with the second-type interface apparatus to process the data transmitted through the first channel.

3. The interface apparatus cascading system according to claim 1, further comprising:
   a plurality of second-type interface apparatus, respectively connected in series with the first-type interface apparatus to process the data transmitted through the second channel.

4. The interface apparatus cascading system according to claim 1, wherein the first-type interface apparatus and the second-type interface apparatus comprise graphics processing devices, display devices, storage devices, or recordable devices utilizing Thunderbolt interface for data transmission.

5. The interface apparatus cascading system according to claim 1, wherein the first-type interface apparatus and the second-type interface apparatus are two disks for a disk array.

6. An interface apparatus cascading method, comprising:
   providing a host comprising a first controller and a first interface port, wherein the first controller provides data transmission of a first channel and a second channel through the first interface port;
   connecting a first-type interface apparatus in series to the host, wherein data of the first channel is transmitted to a second controller of the first-type interface apparatus through a second interface port of the first-type interface apparatus and to a third interface port of the first-type interface apparatus through the second controller, and data of the second channel are directly transmitted to the third interface port through the second interface port, wherein the data of the second channel cannot be transmitted to the second controller; and
   connecting a second-type interface apparatus in series to the first-type interface apparatus, wherein the data of the second channel are transmitted to a third controller of the second-type interface apparatus through a forth interface port of the second-type interface apparatus and to a fifth interface port of the second-type interface apparatus through the third controller, and the data of the first channel are directly transmitted to the fifth interface port through the forth interface port, wherein the data of the first channel cannot be transmitted to the third controller,
   wherein the first controller, the second controller, and the third controller are Thunderbolt controllers supporting dual-channel data transmission.

7. The interface apparatus cascading method according to claim 6, further comprising:
   connecting another first-type interface apparatus in series to the second-type interface apparatus to process the data transmitted through the first channel.

8. The interface apparatus cascading method according to claim 7, further comprising:
   connecting another second-type interface apparatus in series to the another first-type interface apparatus to process the data transmitted through the second channel.

9. The interface apparatus cascading method according to claim 6, further comprising:
   transmitting a backup data to the first-type interface apparatus and the second-type interface apparatus through the first channel and the second channel; and
   storing the backup data in the first-type interface apparatus and the second-type interface apparatus.

10. The interface apparatus cascading method according to claim 6, wherein the first-type interface apparatus and the second-type interface apparatus comprise graphics processing devices, display devices, storage devices, or recordable devices utilizing Thunderbolt interface for data transmission.

* * * * *